(12) United States Patent
Häggander et al.

(10) Patent No.: US 6,799,418 B2
(45) Date of Patent: Oct. 5, 2004

(54) ROCKET ENGINE MEMBER AND METHOD FOR MANUFACTURING A ROCKET ENGINE MEMBER

(75) Inventors: Jan Häggander, Trollhätan (SE); Arne Boman, Trollhätan (SE)

(73) Assignee: Volvo Aero Corporation, Trollhättan (SE)

( * ) Notice: Subject to any disclaimer, the term of this patent is extended or adjusted under 35 U.S.C. 154(b) by 0 days.

(21) Appl. No.: 10/604,329

(22) Filed: Jul. 11, 2003

(65) Prior Publication Data
US 2004/0103638 A1 Jun. 3, 2004

Related U.S. Application Data

(63) Continuation of application No. PCT/SE02/00025, filed on Jan. 9, 2002.
(60) Provisional application No. 60/261,048, filed on Jan. 11, 2001.

(30) Foreign Application Priority Data
Jan. 11, 2001 (SE) .............................................. 0100078

(51) Int. Cl.$^7$ ......................... F02K 11/00; B21D 53/00; B64D 33/04
(52) U.S. Cl. .................... 60/267; 29/890.01; 239/127.1
(58) Field of Search ................ 60/266, 267; 29/890.01; 239/127.1, 127.3

(56) References Cited

U.S. PATENT DOCUMENTS

| | | |
|---|---|---|
| 3,690,103 A | 9/1972 | Dederra et al. |
| 3,897,316 A | 7/1975 | Huang |
| 5,233,755 A | 8/1993 | Vandendriessche |
| 5,375,325 A | 12/1994 | Bales et al. |
| 6,688,100 B1 * | 2/2004 | Wherley et al. .............. 60/257 |

* cited by examiner

Primary Examiner—Charles G. Freay
(74) Attorney, Agent, or Firm—Novak Druce LLP

(57) ABSTRACT

Method and arrangement for providing a liquid fuel rocket engine member (10). The member has a load bearing wall structure (14) having a plurality of cooling channels (11). For improving the heat transfer, a material with a higher thermal conductivity than the load bearing wall structure (14) is applied to the wall structure.

18 Claims, 1 Drawing Sheet

ROCKET ENGINE MEMBER AND METHOD FOR MANUFACTURING A ROCKET ENGINE MEMBER

CROSS REFERENCE TO RELATED APPLICATIONS

This application is a continuation patent application of International Application No. PCT/SE02/00025 filed 9 Jan. 2002 which was published in English pursuant to Article 21(2) of the Patent Cooperation Treaty, and which claims priority to Swedish Application No. 0100078-5 filed 11 Jan. 2001 and to U.S. Provisional Application No. 60/261,048 filed Jan. 11, 2001. Said applications are expressly incorporated herein by reference in their entireties.

TECHNICAL FIELD

The present invention relates to a liquid fuel rocket engine member having a load bearing wall structure comprising a plurality of cooling channels.

BACKGROUND OF THE INVENTION

During operation, a rocket engine member wall structure like a nozzle or a combustion chamber is subjected to very high stresses, for example in the form of a very high temperature on its inside (on the order of magnitude of 980° F.) and a very low temperature on its outside (on the order of magnitude of −370° F.). As a result of this high thermal load, stringent requirements are placed upon the choice of material, design and manufacture of the wall structure. At a minimum the need for effective cooling of the wall structure must be considered.

Its a problem to construct cooled wall structure that are capable of containing and accelerating the hot exhaust gas, and also be reliable through a large number of operational cycles. Known designs do not have a sufficiently long service life required to withstand a large number of operational cycles. These known systems generate large thermal stresses, including large pressure drops, or present difficulties when needing repair.

SUMMARY OF INVENTION

An object of the present invention is to provide a rocket engine member with a reduced heat load on the load bearing wall structure.

The objective is exemplarily achieved by the member having a material of higher thermal conductivity than the load bearing wall structure applied thereto.

As a result of the invention, a rocket engine member may be manufactured which presents high pressure capacity and a long cyclic life, as well as advantageous area ratio.

Advantageous embodiments of the invention can be derived from the following disclosure.

BRIEF DESCRIPTION OF DRAWINGS

The invention will be further described in the following, in a non-limiting way-with reference to the accompanying drawings in which.

DETAILED DESCRIPTION

Figure 1:
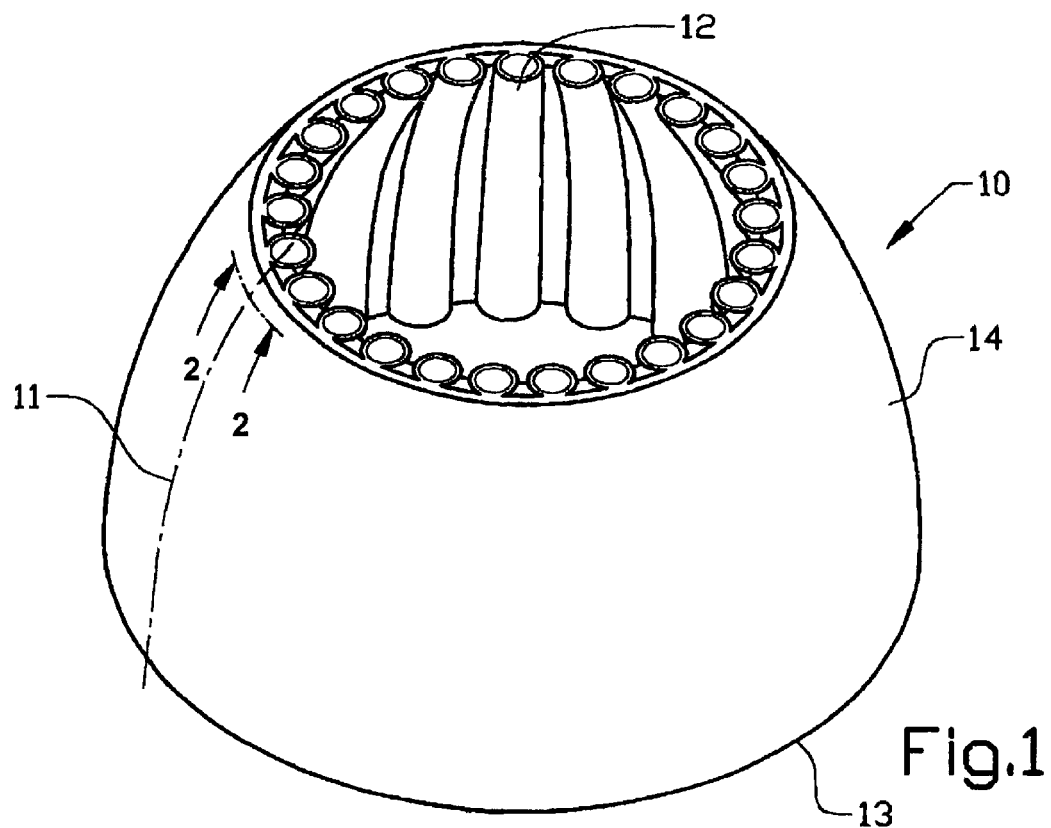
FIG. 1 is a schematic perspective view showing a rocket nozzle having a wall structure according to the teachings of the present invention.

FIG. 1 shows a diagrammatic and somewhat simplified perspective view of an outlet nozzle 10 that has been produced in accordance with the teachings of the present invention. The nozzle is intended for use in rocket engines of the type using liquid fuel, for example liquid hydrogen. The working of such a rocket engine is conventional and therefore not described in detail. The nozzle 10 is cooled with the aid of a cooling medium that is preferably also used as fuel in the particular rocket engine. The invention is, however, not limited to outlet nozzles nor outlet nozzles of this type, but can also be used for rocket combustion chambers and in those cases in which the cooling medium is dumped after it has been used for cooling.

The outlet nozzle is manufactured with an outer shape that is substantially bell-shaped. Thus, the nozzle 10 forms a body of revolution having an axis of revolution and a cross section that varies in diameter along said axis.

The nozzle wall is a structure comprising (including, but not limited to) a plurality of mutually adjacent, tubular cooling channels 11 extending substantially in parallel to the longitudinal axis of the nozzle from an inlet end 12 to an outlet end 13 of the nozzle. The outside of the structure includes a continuous sheet metal wall 14. The tubular cooling channels 11 are curved in the longitudinal direction to conform to the nozzle contour and they are axially oriented along the nozzle wall. In this position, the tubular channels 11 are jointed to the metal wall by welding. The welds are preferably made by laser welding from the outside. This assembly forms a leak tight nozzle with all joints at the cool side of the wall structure.

Figure 2:
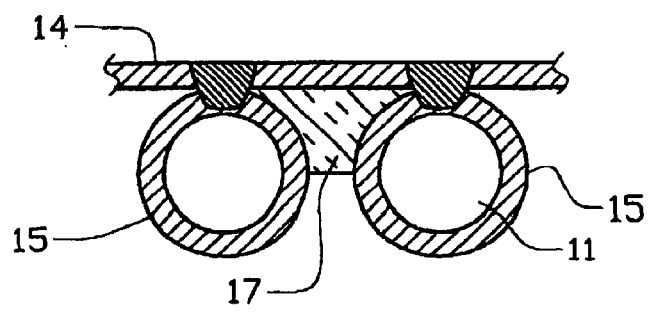
FIG. 2 is a partial sectional view taken along the line 2—2 in FIG. 1, showing a wall structure section, according to a first embodiment of the invention.
Figure 3:
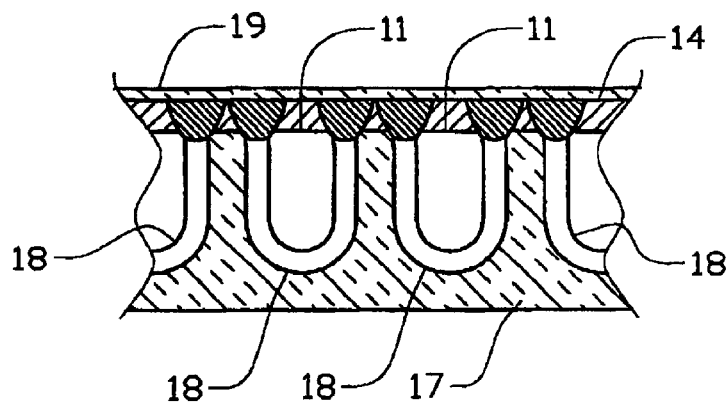
FIG. 3 is a partial sectional view corresponding to the one shown in FIG. 2, but showing cooling channels at the inlet end of the nozzle configured according to a second embodiment of the invention.

The cooling channels 11 in the embodiment according to FIG. 2 and 3 are circular tubes 15 having a varying cross section. The tubes 15 may be seamless and have a smaller cross section at the inlet end 12 of the nozzle than at the opposite end.

FIG. 2 shows a section of the wall structure. The inside of the wall has been coated with a thermally conductive material 17 for increased heat transfer from the sheet metal wall 14 to the tubes 15. This makes it possible for each tube 15 to cool a larger part of the circumference; therefore, the available number of cooling channels can cool a larger diameter. At the same time, the cross sectional area of the channels may be rather small. In this manner, the pressure capacity of the cooling channels can be high. In a case where the conductive material, for example copper or silver, completely fills the cavity, it is possible to reach very high pressures and high area ratios. The thermally conductive material is arranged on the inside of the wall structure and between said cooling tubes 15.

The process to apply the conductive material may include brazing or laser sintering. By introducing a conductive material in the space between the cooling channels, it is possible to increase the spacing of channels and thereby reach large nozzle area ratios without increasing the cooling channel cross section too much to maintain the pressure capacity.

FIG. 3 shows a second embodiment of the invention where U-formed profiles 18 are used instead of the above-described circular tubes 15. The profiles have a varying cross section and a varying material thickness. The profiles are manufactured by press forming sheet metal strips. Normally, the profiles are manufactured from stainless steel and superalloys in order to provide the necessary strength and manufacturing feasibility. The life expectancy of these parts of the rocket element that are subjected to a high thermal load is increased, and in general the materials have a low capacity of heat transmission. According to the invention, this is avoided by the use of the thermally conductive material 17 to reduce the area that the wall exposes to the flame. Also, the surface of the channel profile that is exposed to the heat is increased, as the thermally conductive material distributes the heat to a large part of the channel profile. Both these measures, together or separately, reduces the heat input per area unit of channel profile. In practice, the heat input is reduced by about 20–30% and this input is distributed over an increased (about 50%) surface area according to the shown configuration.

The thermally conductive material is arranged on the inside of the wall between adjacent cooling tubes 15 and, more specifically, on a surface of the cooling channel walls facing the interior of the member 10. Further, the material is applied at the outside of the wall structure as a layer 19.

The variation in profile thickness is adapted to the length of the nozzle. The surface or the thickness distribution of the profiles may also be modified to enhance cooling or strain distribution. The thermally conductive material 17 is thick enough to completely cover the profiles 18. Also, the outside of the wall section has been coated with a layer 19 of the thermally conductive material, for example, copper.

It is possible to build the structures described above from common materials used in the construction of rocket engine nozzle tubes such as stainless steel and nickel based alloys.

The rotationally symmetric surface of a nozzle structure configured according to the teachings of the invention provides stiffness, and, if necessary, allows for attachment of stiffeners in an easy way.

The method of manufacturing the fuel rocket engine will be described below. A plurality of elongated elements in the form of cooling channel tubes 15, or profile members 18, are arranged substantially in parallel with and adjacent to each other, extending from a first end 12 of the rocket engine member to a second end 13 thereof. Each of the elongated elements is attached to the curved sheet metal wall on the inside of the same by welding, thereby forming the wall structure. The sheet metal wall forms an outer casing of the rocket engine member.

Thereafter, a material 17 with a higher thermal conductivity than the material of construction of the wall structure 14, 15 is applied to the wall structure. The material 17 is applied to the inside of the wall structure 14, 15. The material 17 is applied between the cooling channels 11 and arranged in contact with the walls of two adjacent cooling channels 15 forming a connection between them.

The material may be applied in different ways. According to a preferred method, the material, in powder form, is laser sintered to the wall structure. Preferably, a first layer of powder is provided between two adjacent elongated elements, which layer thereafter is subjected to a laser beam. Thereafter, a second layer is provided on top of the laser sintered first layer, which second layer thereafter is subjected to a laser beam. This process is repeated a suitable number of times. The laser sintering method is especially preferable for the embodiment shown in FIG. 3, where it is possible to reach between the elongated elements all the way to the sheet metal with a laser beam.

Other melting processes, like brazing and casting, are also possible to use for applying the material to the wall structure.

The invention is not limited to the above described embodiments, but several modifications are possible within the scope of the following claims. For example, the improved cold wall structure may also be applied to external expansion engines like round and linear aero-spike engines.

What is claimed is:

1. A liquid fuel rocket engine member (10) comprising:

a load bearing wall structure (14, 15) including a plurality of cooling channels (11), wherein the outside of the wall structure includes a curved sheet metal wall (14) and wherein the cooling channels (11) are longitudinally attached to the sheet metal wall; and a material with a higher thermal conductivity than the load bearing wall structure (14, 15) has been applied to said wall structure, that the material (17) is arranged in contact with the sheet metal wall (14), that the material forms a substantially continuous contact surface against the sheet metal wall (14) from the wall of one cooling channel to the wall of an adjacent cooling channel and that the material (17) at least partly surrounds the walls of the cooling channels (11).

2. The liquid fuel rocket engine member as recited in claim 1, further comprising:

the material (17) has been applied to the inside of the wall structure (14, 15).

3. The liquid fuel rocket engine member as recited in claim 1, further comprising:

the material (17) has been applied between the cooling channels (11).

4. The liquid fuel rocket engine member as recited in claim 3, further comprising:

the material (17) is arranged in contact with the walls of two adjacent cooling channels (15) forming a connection between them.

5. The liquid fuel rocket engine member as recited in claim 1, further comprising:

the material (17) is arranged on a surface of the cooling channel walls facing the interior of the member (10).

6. The liquid fuel rocket engine member as recited in claim 1, further comprising:

the material (17) is also positioned at the outside of the wall structure (14, 15) as a layer (19).

7. The liquid fuel rocket engine member as recited in claim 1, further comprising:

the material (17) comprises copper.

8. The liquid fuel rocket engine member as recited in claim 1, further comprising:

the material (17) comprises silver.

9. The liquid fuel rocket engine member as recited in claim 1, further comprising:

the material (17) has been applied by brazing.

10. The liquid fuel rocket engine member as recited in claim 1, further comprising:

the material (17) has been applied by laser sintering.

11. A method for manufacturing a liquid fuel rocket engine member (10) comprising:

arranging a plurality of cooling channels (15) adjacent to each other for at least partly forming a wall structure of the member, wherein the cooling channels (11) are longitudinally attached to a curved sheet metal wall (14) on the inside of the same, thereby forming said wall structure; and applying a material (17) with a higher thermal conductivity than the material of the wall structure (14, 15) to said wall structure so that the material (17) is applied between the cooling channels (11), that the material (17) is arranged in contact with the walls of two adjacent cooling channels (15) forming a connection between them and that the material (17) at least partly surrounds the walls of the cooling channels (11).

12. The method as recited in claim 11, further comprising:
applying the material (17) to the inside of the wall structure (14, 15).

13. The method as recited in claim 11, further comprising:
arranging the material (17) on a surface of the cooling channel walls facing the interior of the member (10).

14. The method as recited in claim 11, further comprising:
positioning the material (17) at the outside of the wall structure (14, 15) as a layer (19).

15. The method as recited in claim 11, further comprising:
applying the material (17) by a melting process.

16. The method as recited in claim 15, further comprising:
applying the material (17) by brazing.

17. The method as recited in claim 15, further comprising:
applying the material (17) by casting.

18. The method as recited in claim 15, further comprising:
applying the material (17) by laser sintering.

* * * * *